Jan. 19, 1937.   A. G. THOMAS   2,068,476
OIL TESTING DEVICE
Filed Dec. 15, 1933   3 Sheets-Sheet 1
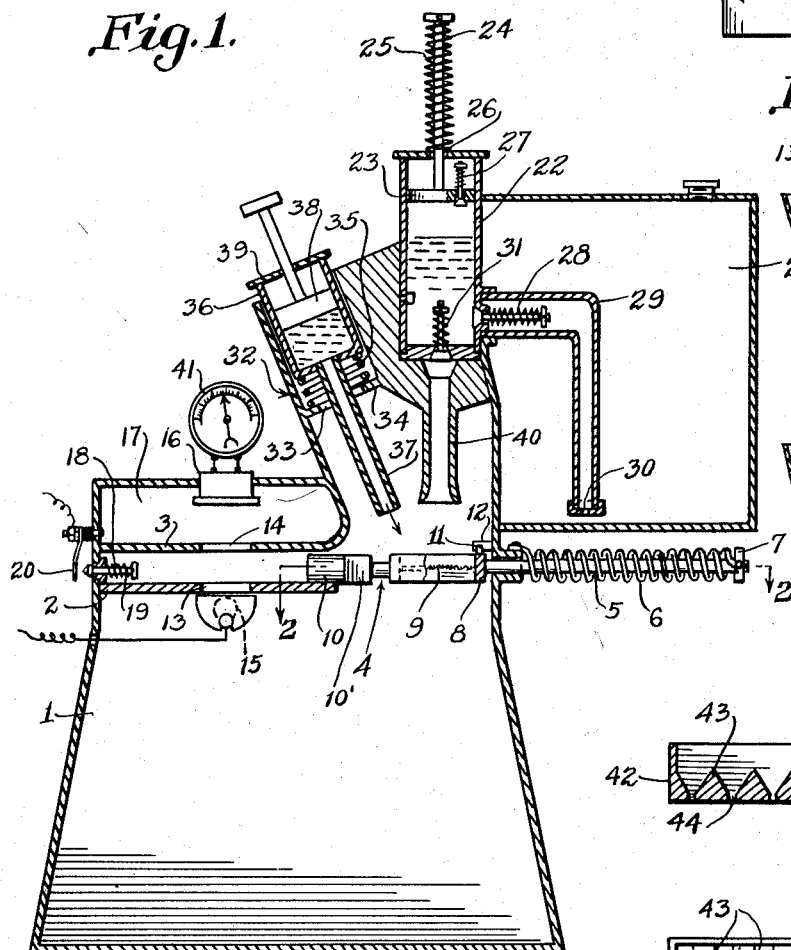
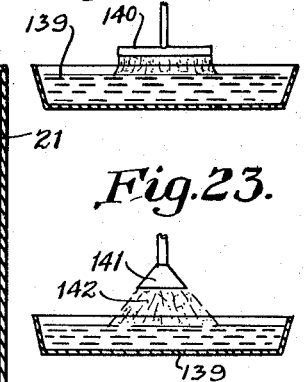
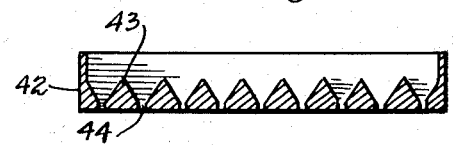
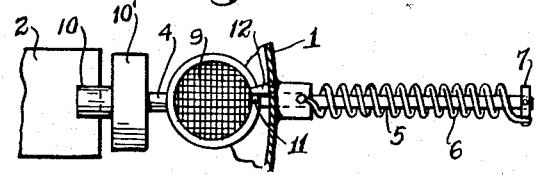
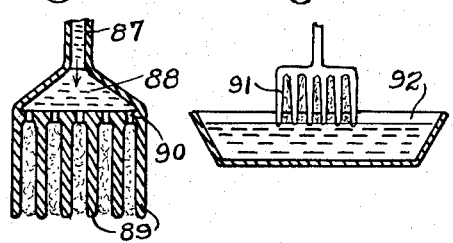
Inventor
A. G. THOMAS
By Mason Fenwick Lawrence
Attorneys Jan. 19, 1937.  A. G. THOMAS  2,068,476

OIL TESTING DEVICE

Filed Dec. 15, 1933  3 Sheets-Sheet 2

Inventor
A. G. Thomas
By Mason Fenwick & Lawrence
Attorneys

Jan. 19, 1937. A. G. THOMAS 2,068,476
OIL TESTING DEVICE
Filed Dec. 15, 1933 3 Sheets-Sheet 3
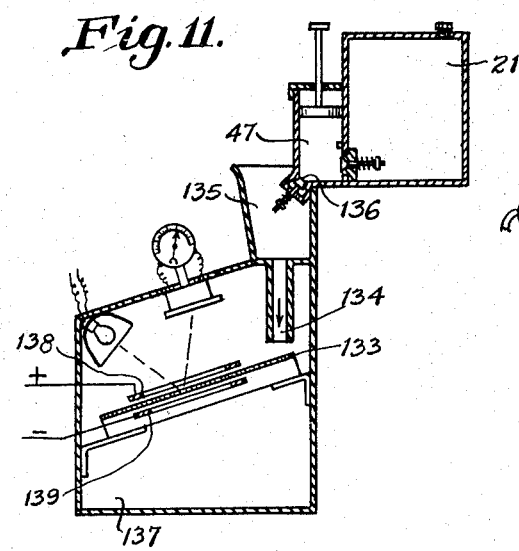
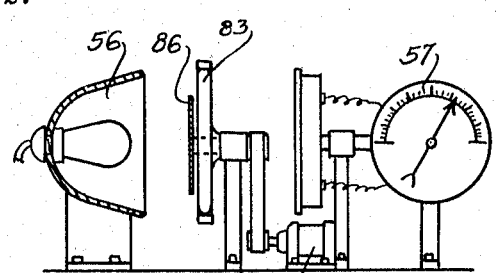
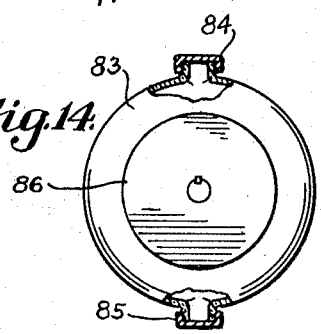
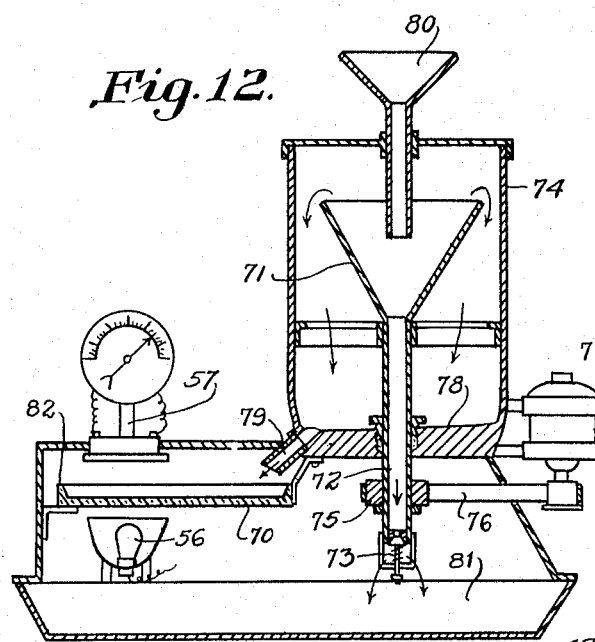
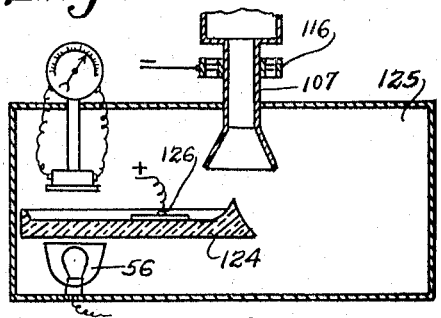
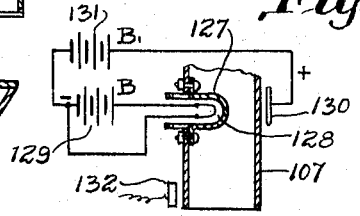
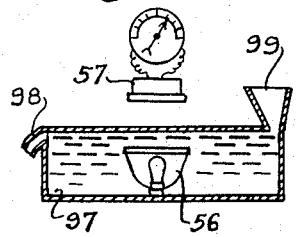
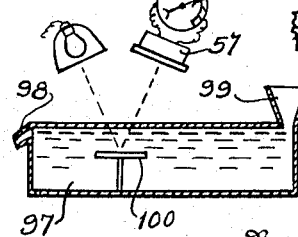
Inventor
A. G. Thomas
By Mason Fenwick & Lawrence
Attorneys Patented Jan. 19, 1937

2,068,476

UNITED STATES PATENT OFFICE 2,068,476

OIL TESTING DEVICE

Albert G. Thomas, Lynchburg, Va.

Application December 15, 1933, Serial No. 702,599

5 Claims. (Cl. 88—14)

This invention relates to oil testing devices designed particularly for ascertaining the degree of fitness remaining in used lubricating oil. It employs the principle of the photo-electric cell, determining the degree of contamination through the instrumentality of transmitted or reflected light.

Devices which test used oil photo-electrically are known, but the results are frequently spurious inasmuch as they may be indiscriminate as regards harmless and deleterious light-occluding particles. It is well known that new oil after being churned about in the crank case of the engine of an automobile for example becomes discolored by the film of used oil clinging to the parts in the crank case remaining from the former charge of oil, and while the new oil although discolored, is perfectly good, it would show up poorly in an indiscriminate photo-electric test.

One of the objects of the present invention is to provide apparatus for separating the colloidal from the gross particles and subjecting a concentration of the latter only, to the photo-electric test.

Another object of the invention is to provide means for classifying the colloidal and the gross particles either mechanically, electrically or by a combination of both agencies.

Still another object of the invention is to provide for dilution of the oil under test whereby the point of demarcation between the colloidal and the larger particles is accentuated and wherein the fluidity of the oil is so increased as to provide ease of travel of the foreign particles through the oil body when selectively attracted, as will appear, and to rid the sediment of oil when the test is not to be contemplated by color or viscosity factors.

A further object of the invention is the provision of apparatus by means of which portions of lubricating oil may conveniently be drawn from crank cases of combustion engines for purpose of the test.

Still another object of the invention is the provision of means for testing the colloidal as well as the large particles of oil and if desired also the viscosity of the same.

Other objects of the invention will appear as the following description of a number of exemplary embodiments thereof proceeds.

Referring to the accompanying drawings throughout the several figures of which the same characters of reference have been used to designate identical parts:

Figure 1 is a vertical section through apparatus for withdrawing used lubricating oil from the engine crank case and subjecting it to the sediment test;

Figure 2 is a section taken along the line 2—2 of Figure 1;

Figure 2A is a slightly modified form of the screen shifting mechanism shown in Figure 2;

Figures 3 and 4 are, respectively, cross sectional and plan views of an alternative form of screen construction which may be substituted for the mesh screens shown in any of the illustrated modifications of the invention;

Figure 11 is a vertical section through a modified form of the invention in which the sedimentary particles are electrically collected from a film of oil flowing down an inclined plate;

Figure 12 is a vertical section through a modification of the invention in which the harmful particles are concentrated centrifugally in a fraction of oil which is diverted to a transparent tray in which the film of oil is maintained at constant thickness in the field of the photo-electric cell;

Figure 13 is a side elevation partly in section through a form of the invention in which the concentration of molar particles is produced in the peripheral portion of a whirling transparent cell exposed between a source of light and a photo-electric cell;

Figure 14 is a front view of the rotating cell;

Figure 15 is a vertical section through a form of the invention in which the sediment to be tested is electrically diverted from the main body of oil to the testing cell and by the same electrical instrumentality collected in the field of vision of the photo-electric cell;

Figure 16 is a vertical section through a modified form of apparatus for concentrating the molar particles to one side of a column of flowing oil;

Figure 17 is a vertical section through a tined screen for testing the viscosity as well as the contamination by solid particles of used lubricating oil;

Figure 18 is a side elevation illustrating the employment of the tined device shown in Figure 17 by immersion in a body of oil to be tested, followed by its emergence;

Figure 19 is a plan view of a testing device in which the light passing through a film of the sediment bearing oil is magnified by a lens the image being projected upon a screen and a portion of the light passing to a photo-electric cell, whereby a visual image as well as a photo-electric indication of the state of the oil may be obtained;

Figure 20 is a vertical section through a form of the invention in which sediment bearing oil either in its natural state or diluted is presented in the path of a beam of light to a photo-electric cell from a submerged source, the thickness of the film being maintained constant by an overflow;

Figure 21 is a slight modification of the device shown in Figure 20 in which a mirror is submerged, the light beam being reflected from the mirror to the photo-electric cell;

Figures 22 and 23 are views in detail showing diagrammatically alternative means for creating a film of oil through which the beam of the photo-electric couple may be passed.

Figure 5:
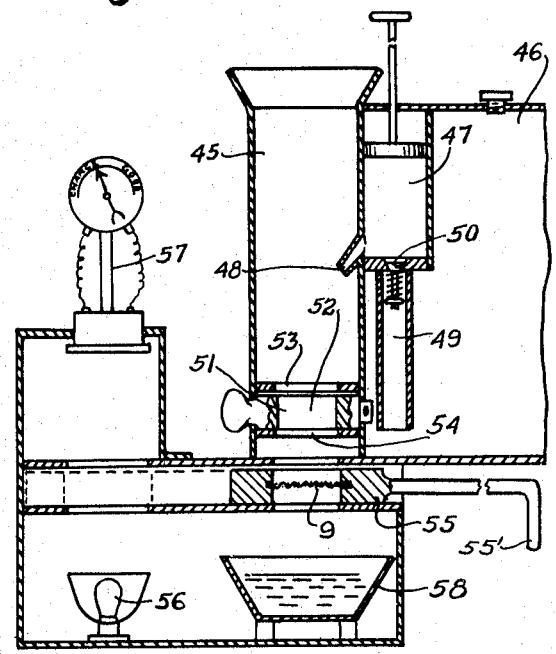
Figure 5 is a vertical section through a modified form of the invention in which the oil is diluted before being delivered to the screen.

It will be understood that all of the above described figures are more or less diagrammatic.

Referring now in detail to the several figures and first adverting to that form of the invention shown in Figures 1 and 2, the numeral 1 represents a can or reservoir constituting a chamber for collecting the oil that has been tested. Situated at the upper part of the can 1 are spaced guide members 2 and 3 in which slides a carriage 4 constituted by a plunger rod 5 projecting externally of the can and biased toward an outward position by means of the spring abutting at one end against the can and at the other against a button 7 or its equivalent at the end of the plunger rod 5. The inner end of the plunger rod is secured, within the can, to a ring 8, said ring forms the frame for a screen 9 and diametrically opposite the plunger rod 5 the ring 8 is secured to a trunnion 10 adapted to rotate in the slot formed between the guide members 2 and 3, the plunger rod forwardly of said trunnion provided with a rectangular slide 10' adapted to be guided between the guide members 2 and 3 and to positively hold the screen 9 in horizontal position while the said slide is between said guide members. The ring 8 is provided on its upper portion with a lug 11 which abuts a stop 12 formed on the can. When the said lug is against the said stop the ring 8 is in horizontal position. The spring 6 exerts a torsional bias upon the plunger rod 5 maintaining the lug 11 in contact with the stop 12 and preventing the inadvertent overturning of the ring 8 together with the screen 9.

The guide members 2 and 3 are provided with alined apertures 13 and 14. A source of illumination such as an electric lamp 15 is beneath the aperture 13 and a photo-electric cell 16 housed in a dark chamber 17 is above the aperture 14. The plunger rod 5 is adapted to be pushed in against the tension of the spring 6 until the ring 8 together with the screen 9 is in alinement with the apertures 13 and 14 so that the beam from the electric light 15 will pass through the screen 9 which may be of metal gauze, filter paper, etc.; and impinge upon the photo-electric cell.

In the back of the space between the guide members 2 and 3 is a switch stem 18 normally pressed inwardly by a spring 19 and which switch member is represented as being grounded as is also one of the terminals of the electric lamp. The switch stem therefore is in electrical continuity with the circuit through the lamp. The switch stem is adapted when pressed outwardly to make contact with a spring terminal 20 connected to the other side of the source of electric energy, thus the circuit through the lamp is completed. When the plunger rod 5 is pushed inwardly to the position in which the screen is in alinement with the apertures 13 and 14, the trunnion 10 will have pushed the switch stem into contact with the spring terminal and have caused the illumination of the electric light. When the plunger rod is automatically restored to its normal position of repose as shown, the circuit is broken and the light automatically extinguished. The switch stem 18 serves also as a stop for the trunnion 10 assuring the accurate positioning of the screen 9 in the path of the light beam of the photo-electric couple.

A tank 21 is structurally associated with the can 1 and contains a quantity of a diluent fluid such for example as kerosene. Adjacent the tank 21 is a cylinder 22 having a piston 23 adapted to be manually actuated by an external rod 24 having a spring 25 which normally holds the piston in its uppermost position. Preferably, there is air leakage at the point 26 between the piston rod 25 and the top of the cylinder 22. The piston has a check valve 27 opening inwardly when the piston is raised to admit air to the cylinder. The cylinder near its lower portion is provided with an inwardly opening check valve 28 controlling the flow of kerosene to the cylinder through a conduit 29 having a restricted opening 30 near the bottom of the kerosene tank. Thus when the piston 23 automatically lifts under the urge of the spring 25 kerosene and air are taken in simultaneously through the respective check valves, the kerosene partially filling the cylinder and the upper part of the cylinder beneath the piston being filled with air. An outwardly opening check valve 31 prevents discharge of the contents of the cylinder until the check valve 31 is overcome by the pressure of the contents of the cylinder when the piston rod is manually depressed. A well 32 is provided adjacent the cylinder 22 having an aperture 33 placing said well in communication with the can 1. Said aperture is of somewhat smaller diameter than that of the well defining a ledge 34. A spring 35 is positioned in the bottom of the well and supported by the ledge 34.

The well 32 functions as a receiver for a syringe 39, the latter comprising a barrel 36 having a nozzle 37 and a plunger 38. The syringe 39 seats on the spring 35. The syringe is adapted to be bodily removed from the well to have the nozzle inserted in an aperture leading to the crank case sump of an internal combustion engine and to draw a specimen of oil from the crank case for the purpose of the test. The syringe with the charge of oil is then re-inserted in the well.

It will be observed that the cylinder 22 has a nozzle 40 in alinement with the screen 9 and that the syringe is mounted in an inclined position so that while in its position of repose, the end of the nozzle 37 clears the ring 8 so that if oil should drip from the end of the nozzle 37, it will not land on the screen. When the plunger of the syringe is pushed in for purpose of discharging oil onto the screen, the pushing pressure is imparted to the spring 35 which spring being fairly light contracts simultaneously with the descent of the plunger into the barrel of the syringe, the contraction of the spring having the effect of moving the nozzle of the syringe axially downward into a position overlying the screen 9 so that when the pressure upon the plunger ejects the oil from the syringe it will impinge upon the screen 9. Some of the oil may go through, but some of it will collect in the cup constituted by the screen 9 and the upper part of the ring 8, or remain in the interstices of the screen.

After the screen has been supplied with oil the piston rod 24 is depressed, opening the check valve 31 and permitting a jet of kerosene to impinge upon the lubricating oil upon the screen 9. This dilutes the oil on said screen and causes most of it to pass through the meshes of the screen. The screen is of such fineness as to permit the colloidal particles to pass through with the diluted oil, but the larger particles are retained upon the surface of the screen. If the piston rod 25 is pushed inward to its limit, a jet of air will follow the jet of kerosene, the air blowing out all vestiges of the diluted oil and leaving only the deleterious particles on the surface of the screen.

Next, the plunger 5 is pushed inwardly until the screen 9 comes into the path of the beam from the lamp 15 to the photo-electric cell. The trunnion 10 closes the circuit at the point 20 lighting the lamp. The beam passes through the sediment, its intensity being more or less obscured by the amount of sediment, and its value recorded on the dial 41 of the photo-electric current indicator.

After the test, the plunger 5 is let go and will automatically move outwardly under the urge of the spring 6. For cleaning the screen 9 preparatory to another test, the button 7 is turned, inverting the ring 8 together with the screen 9. While it is in inverted position, the piston rod 24 is again pressed shooting another volume of kerosene, followed by air, through the screen washing out all of the sedimentary matter. When the button is let go the ring 8 with the screen 9 automatically resumes its original position with the lug 11 against the stop 12.

Other means, the equivalent of those shown in Figures 2 and 2A may be employed for keeping the ring 8 with its associated screen in a horizontal position. If desired, the air blast may be omitted and likewise the diluting fluid, the test being made for the contaminating matter held in the oil filling the meshes of the screen, this test including the colloidal as well as the larger of the contaminating particles.

Other devices than a screen may be substituted therefor, in this as well as forms of the invention yet to be described. Figures 3 and 4 for example, show a grid 42 in the form of a dish having a corrugated bottom 43 and in the valleys of the corrugations are slots 44. This dish may be made of glass or metal. The sedimentary particles are held back by the slots 44 and if the dish is made of metal a comparatively small proportion of sediment will create quite an obscuration of the transmitted light.

Figure 2A shows a modified form of the screen shifting mechanism adapted to be used alternatively for that shown in Figure 1 and including a rectangular slide 133 having a recess 134 at its forward end and an aperture 135 formed in the front face of said slide member and communicating with said recess. The ring 8 which carries the screen 9 has a hooked rod 136 fixed to the rear portion thereof, said rod passing through the aperture in the front face of the slide member and the hook being received in the recess 134. The hook normally rests against one wall of said recess when the ring 8 is in horizontal position, limiting the rotation of the ring in one direction. The recess however is sufficiently extended on the opposite side of said hook to permit the hook to rotate through an angle of 180° permitting the ring 8 to be overturned for cleansing purposes. A torsional spring 137 surrounds the rod 136 being fixed to the ring 9 at one end and to the slide member 133 at the other and normally biases the hook into engagement with the wall of the recess 134. Thus throughout the range of shifting movement of the screen 9, the said screen is held positively in a horizontal position and inadvertent dipping thereof and the spilling of the contents while the screen is in transit from the receiving position to a position in the path of the light beam, is prevented.

Referring to that form of the invention shown in Figure 5, the oil to be tested is designed to be supplied to the cylinder 45 and to be diluted by means of kerosene or its equivalent drawn from the tank 46 by a suction pump 47 and delivered to the oil in the cylinder 45 by way of a spout 48. The diluent enters the pump 47 by way of a conduit 49 through a check valve 50, the conduit 49 opening near the bottom of the tank 46. The outlet of diluted oil of the cylinder 45 is controlled by a suitable valve for example the boiler valve 51 having a wide slot 52 adapted to register with slots 53 and 54. When the valve is opened, oil is discharged upon the screen 9. Said screen is mounted in a sliding carriage 55 having a handle 55' by means of which the carriage may be pushed into the path of the light beam from the electric lamp 56 to the photo-electric unit 57. The carriage 55 together with the screen 9 may be pulled out for purpose of cleansing.

The diluted oil passes freely through the screen 9 taking with it the colloidal particles and leaving the harmful sediment upon the screen. The oil which passes through the screen 9 collects in a bowl 58.

Figure 6:
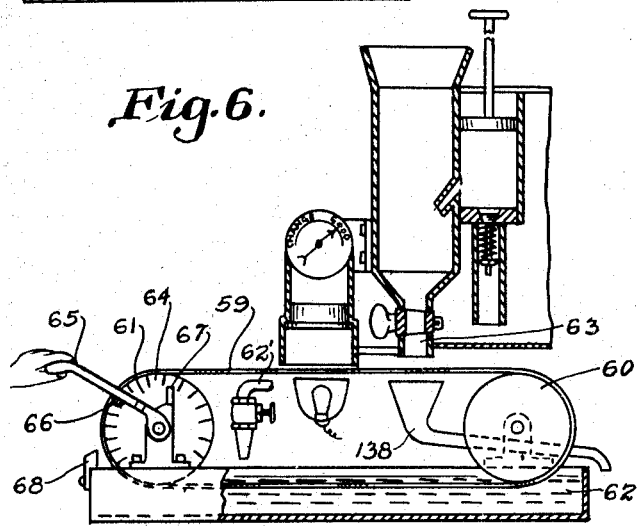
Figure 6 illustrates another form of the invention in which the screen has the form of an endless belt adapted to be brought by step to step progress into the vision of the photo-electric cell.

Figure 6 shows a form of the invention in which the oil receiving and diluting means are quite similar to those described in connection with Figure 5, but in this instance the carriage 55 and screen 9 is substituted by an endless screen 59 in the form of a belt, passing over rollers or sprockets 60 and 61. The upper flight of said belt passes in proximity to the photo-electric cell while the lower flight passes through a reservoir 62 containing a cleaning fluid such as kerosene. The roller 61 is provided with ratchet teeth 64 and on operating handle 65 mounted co-axially of the roller 61 is a pawl 66 adapted to ride over the teeth 64 in one direction, but to engage said teeth when moved in the opposite direction and thereby to impart step by step partial rotation to the roller 61 and to the screen belt 59. Stops 67 and 68 are engaged by the handle 65 in each of its extreme positions and determine a range of angular amplitude which will bring the area of the screen on which the sediment has been deposited to a position beneath the photo-electric cell. The oil which passes through the screen drains into a discharge conduit 138 from which it is led off to any convenient receptacle, not shown. Sediment is washed from the screen by the passage of the lower flight of the belt through the body of cleaning fluid in the reservoir 62. An air jet from the nozzle 62' facilitates the cleansing process.

Figure 7:
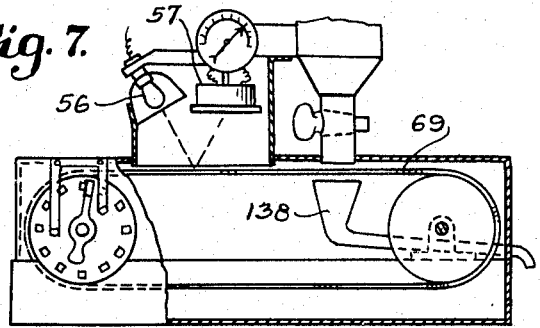
Figure 7 is a vertical section through another form of the invention in which the endless belt has a light reflected surface.

In Figure 7 a slightly modified form of the apparatus described in connection with Figure 6 is illustrated in which the screen belt 69 may have a light reflective surface produced for example by plating the screen with chromium or the like, or making it of inherently bright material. The source of illumination is placed above the belt and light after passing through the film of sediment bearing oil is reflected to the photo-electric cell. This has the advantage that the light has passed twice through the film of oil thus increasing the sensitivity of the test. The screen belt may be of wire mesh, or of paper so that light is reflected through the sediment remaining after the oil has passed through, or it may be solid and the light reflected through the oil film. Instead of an endless belt, the screen may be of a continuous ribbon wound on a reel, drawn out step by step and the used portions successively discarded.

Figure 12 illustrates a form of the invention in which the larger and harmful particles of suspended matter are concentrated in a small fraction of oil by centrifugal force before being delivered to the test dish. The apparatus for carrying out the operation according to this principle may comprise a rotating cup 71 having a hollow vertical axial shaft 72, the open lower end of which is controlled by check valve 73. Said cup is enclosed within a casing 74. A pulley 75 is mounted on the shaft 72 and is driven through a belt 76 from the electric motor 77. The casing 74 forms a chamber having the bottom wall 78 thereof preferably sloping to one point, at which point there is an outlet 79 discharging into the dish 70. Oil, preferably properly diluted is poured into the funnel from whence it runs into the rotating cup 71. The heavier particles will be thrown outwardly by centrifugal force climbing the flaring sides of the cup 71 and overflowing with a portion of the oil. The colloidal particles remain at the center and pass down being discharged through the manually operable valve 73 into the reservoir 81 after the test is finished.

The dish 70 may be provided with a flange 82 as shown providing a constant level for the sediment bearing oil and thus determining a uniform thickness for the body of oil through which the beam from the source of illumination 56 passes to the photo-electric cell 57.

Figures 13 and 14 illustrate another utilization of centrifugal force in classifying the harmful larger particles and the harmless particles of colloidal size. Between the source of light 56 and the photo-electric cell 57 a centrifuging flask 83 is rotatably mounted, the rotating means comprising for example, an electric motor 77 and suitable belt gearing. The flask preferably has inlet and outlet openings 84 and 85, respectively, preferably diametrically arranged in the interest of balance and suitably closed as by screw caps. An opaque disk 86 is mounted so as to shield the central portion of the flask 83 from the light, only the peripheral portion being exposed to illumination. The flask is filled with the oil to be tested and then rotated. The sedimentary particles fly out under the urge of centrifugal force occupying the exposed band through which the light passes to the photo-electric cell.

It is contemplated that the flask can be readily demounted and flushed by taking off the screw caps so as to prepare it for subsequent testing. The screen 86 is desired may be substituted by an annular screen covering the peripheral portion of the flask, but leaving the central portion exposed to the light beam. In this case it would be the colloidal particles which would be tested.

Figures 17 and 18 show details appertaining to equivalents of the screen as a receptor for the oil to be tested. Figure 17 shows a conduit 87 into which oil may be introduced in any suitable manner, said conduit having a flaring portion 88 from which depend a series of tines 89. Between the tines are small openings 90. The oil issues from said small openings spreading itself by surface tension across the spaces between said tines thus making a test possible which includes viscosity as a factor, also the colloidal particles, the edges of the tines being preferably so shaped as to promote the optimum distribution of the oil film by capillarity or surface tension.

Figure 18 shows a simple tined device 91 adapted to be dipped into a pan 92 of the oil to be tested and to be withdrawn therefrom carrying with it a film of oil bridging the spaces between the tines. This also is applicable to a test for viscosity as well as contamination. In place of the tined device 91, a simple transparent or translucent plate may be dipped into the pan 92 so as to acquire a film of oil and then be lifted from said pan and exposed to the transmission or the reflection of the light beam of the photo-electric couple.

In Figure 19 a form of the invention is disclosed in which a cell 93 including parallel spaced transparent walls or a mesh or tine screen or equivalent arrangement is placed in front of the source of illumination 56. An optical screen 94 is placed at a suitable distance from the cell 93, a lens 95 intervening so that a magnified image of the film of sediment bearing oil in the cell 93 is projected upon the screen 94. A photo-electric cell 96 may be placed slightly forward of the screen 94 and receive a portion of the direct rays passing through the cell 93. In this manner an observer obtains a visual picture of the state of the oil as well as a photo-electric evaluation of the condition of the oil.

Figures 20 and 21 show simple testing devices employing a tank 97 having an overflow 98 near the top and being supplied with the oil to be tested by any suitable means exemplified by the funnel 99. A photo-electric cell 57 is placed above the open top of said tank. In Figure 20, the source of illumination is immersed in the tank at a certain determined level below the constant liquid level determined by the overflow. In Figure 21 a mirror 100 is placed at this determined level. In Figure 20 the beam from the source of illumination to the photo-electric cell passes by direct transmission through a determined thickness of the oil body. In Figure 21 the source of illumination is above the tank 97 and the light is transmitted by reflection to the photo-electric cell, passing through the determined thickness of oil twice. It will be understood in all of the figures of the drawings that the photo-electric cell is in each instance designed to be enclosed so as to be protected from extraneous light.

Figures 22 and 23 show means for creating a film of oil through which the testing light beam may be passed and in which not only viscosity, but the density of the colloidal particles as well as those of larger and more deleterious nature may be tested. Figure 22 represents a dish 139 adapted to contain a body of the oil to be tested, into which a rod 140 held horizontally may be dipped and then elevated to a distance above the surface of the oil within the dish. In Figure 23, the oil to be tested is sprayed through a flat nozzle 141 forming a descending curtain or film 142 which when exposed to the beam of the photo-electric couple, enables a test of the colloidal as well as the larger particles.

Figure 8:
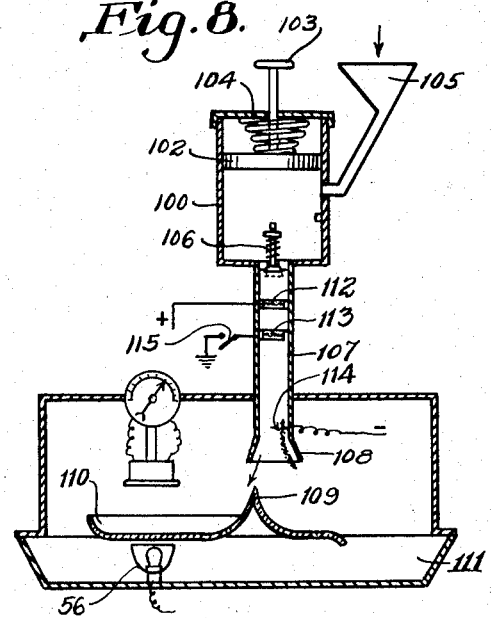
Figure 8 is another modification in which classification of the sediment to be tested from the colloidal particles is accomplished through electric instrumentality.

In all those forms of the invention which have so far been described the means for classifying the harmful and the harmless contaminating particles have been purely mechanical. The process of classification may be materially facilitated by electric means either alone or as adjunctive to the mechanical means. Figure 8 shows a form of the invention in which a cylinder 100 is provided with a piston 102 and an external operating rod 103. This piston is normally biased downward by the spring 104. A funnel 105 is provided for supplying used lubricating oil, preferably diluted to the cylinder 100. A spring closed check valve 106 retains the contents in the cylinder 100 until the piston 102 is released and descends under the expansion of the spring 104.

The outlet to the cylinder 100 is a tube 107 of insulation material preferably glass. The lower end of the tube 107 is flared as shown at 108 and beneath it is a ridge 109, one side of which slopes toward the dish 110 while the other discharges into the reservoir 111. The ridge 109 is so placed that when the column of oil descends the tube 107 the major portion of the oil flows into the reservoir 111 while the minor portion is diverted into the dish. Electrical means is provided for drawing the major portion of the contaminating particles into the part of oil column flowing into the dish. This means may be screens 112 and 113 arranged in longitudinally spaced relation in the tube 107, and at the bottom of the tube and to the far side of that part of the oil column which is destined to flow into the dish is a plate 114. The screen 112 and plate 114 are connected to the terminals of a high potential source of electro-motive force. The polarity may be determined so as to insure the movement of the particles dishward. By way of example, the screen 112 is shown as connected to the positive terminal while the plate 114 is connected to the negative terminal. The screen 113 is adapted to be grounded or not and is therefore in circuit with the switch 115. When the oil descends through the tube 107 the particles passing through the screen 112 become charged by induction. The positive charge will be repelled. When the particles pass through the screen 113 if the latter be grounded the positive charge will be repelled to the ground. The particles passing down with the oil then have a negative charge. Upon coming into the zone of the negatively charged plate 114 the negatively charged particles will be repelled toward the left as shown in Figure 8, that is to say, into the stream of oil flowing into the dish. The beam from the light source 56 passes through the layer of oil in the dish 110 into which the contaminating particles have been thus concentrated.

Figure 9:
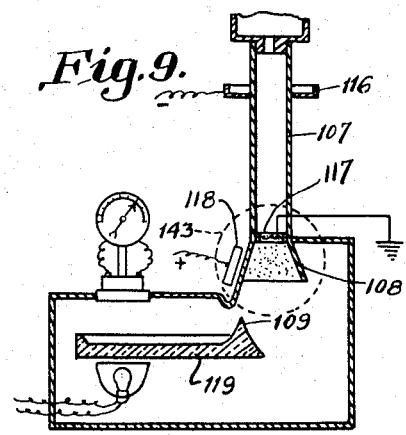
Figure 9 is a form of the invention somewhat similar to that shown in Figure 8 in which the classification is assisted by a magnetic field.

Figure 9 is a variant of that form of the invention shown in Figure 8. Some of the parts which will apply in both instances have been omitted for the sake of brevity. In this form of the invention the glass 107 is surrounded near the top by a ring 116. Said ring constitutes one terminal of a source of high potential electricity for example, the negative terminal, the other side of the source of high potential being connected to the terminal 118 which preferably extends adjacent the flared mouth 108. Particles suspended in the oil which passes downward through the glass tube 107 become charged in the electrostatic field between the terminals 116 and 118. A grounded screen 117 is placed in the glass tube 107 adjacent the terminal 118 so that the positive charge on the suspended particles is dispelled to the ground. A magnet 143 is placed adjacent the mouth 108 creating a magnetic field extending transversely of the direction in which the suspended charged particles descend and deflecting them to one side of said flared mouth. In order to determine the direction of said deflection, the polarity of the terminals 116 and 118 may, if necessary, be reversed. A magnet 118 which may be either electro or permanent is situated below the screen 117. The dish 119 has a ridge 109 similar to that shown in Figure 8 and similarly placed with respect to the mouth of the tube 107, it being understood that the direction of deflection of the suspended particles is so determined as to bring them into that portion of the oil stream diverted by the ridge 109 into the dish 119.

Figure 10:
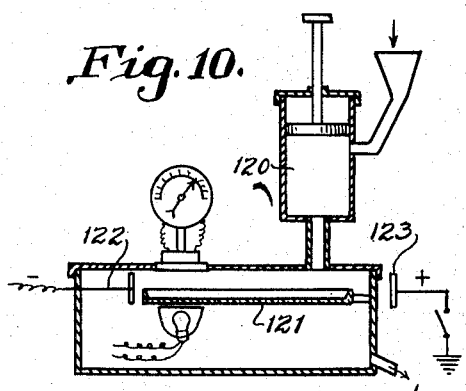
Figure 10 is a vertical section through a form of the invention in which selective attraction of the particles to be tested toward a focal region in the light beam to the photo-electric cell is accomplished electrically.

Figure 10 shows a form of the invention in which the oil is sprayed from the cylinder 120 directly into the dish 121. The dish is placed in a charged field between the negative and positive terminals 122 and 123, respectively, of a high potential electro-motive source. The light source and photo-electric cell are positioned near one end of the dish. The negatively charged terminal 122 will attract the charged particles of matter directly under the photo-electric cell with results as previously described. The positive terminal is adapted to be grounded as shown.

Figure 11 illustrates a form of the invention in which a transparent plate 133 is arranged in an inclined position as shown with its higher end beneath the outlet 134 of the oil receiver 135. A sample of the oil to be tested is placed in the receiver and diluted by kerosene drawn from the tank 21 into the pump 47 and discharged past the check valve 136. The oil spreads over the surface of the plate 133 and flows by gravity over its lower edge into the reservoir 137. If desired, the surface of the glass plate may be somewhat roughened so that the larger harmful particles such as grit, metal, etc., will catch on the glass plate while the smaller suspended carbon particles will be washed off the plate with the diluted oil. Therefore only the larger contaminating particles will remain. The concentration of these large particles is enhanced by the provision of an electric field which may be constituted by the pair of annular rings 138 and 139 arranged respectively above and below the glass plate and which are connected to the terminals of a high potential electro-motive source. The contaminating particles passing through this field are electrically charged and will be attracted to the surface of the plate 133. The polarity of the rings may be reversed if necessary to obtain the desired direction of attraction. The plate 133 may have a mirror surface.

In Figure 15 is shown a further modification of the invention in which the dish 124 is placed as in former examples beneath the flared end of an insulation tube 107 in such manner that the stream of oil is divided by the ridge, part flowing into the dish 124 and part into the general reservoir 125. In this form of the invention the tube is surrounded by a ring 116 and a charged field is carried beyond the mouth of the tube and into the dish itself by the positioning of the positive terminal 126 of the high potential electro-motive source in the dish. The charged particles are diverted to the region permeated by the light beam from the lamp 56 in the manner already described.

In Figure 16, the numeral 107 represents the lower end of the tube bearing the same reference character and which has been shown in previous illustrations. One side of the tube is formed with an aperture in which is inserted in fluid-tight relation, a thin metallic vessel 127 hermetically sealed and in which a vacuum may be maintained. A filament 128 is enclosed in this vessel. A battery 129 may be employed to furnish current for the filament. A plate 130 is arranged outside of the tube 107 opposite the vessel 127, said plate having a positive bias derived from the high potential battery 131. The vessel 127 is made of thin material in order to permit escape of the electrons. The electrons from the heated filament 128 will be drawn toward the plate 130 and some of them will strike the contaminating particles in the oil giving these particles negative charges. They may be diverted by the electro-magnet 132 or by an electro-static field, not shown.

It is obvious from the numerous examples as herein illustrated and described showing different applications of the inventive principle that the number of ways in which it may be carried out are beyond comprehension and that the various forms in which I have illustrated the concept of my invention are to be regarded merely as exemplary and not as limiting the scope of the invention. For instance, the lower terminal 114 of Figure 8 may be a ring as 112, or it may be a plate outside the tube 7. It is well known that a fine spray causes the particles to become charged. The oil may be sprayed from a nozzle and the resulting charged particles deflected in the manner above described.

What I claim is:

1. Apparatus for testing the fitness of used lubricating oil comprising a screen for collecting the larger contaminating particles from said oil while permitting the colloidal particles to filter through, means for freeing the contaminating particles from oil while on said screen comprising a cylinder having its mouth adapted to discharge upon said screen, a plunger in said cylinder, a diluent supply communicating with said cylinder, said cylinder receiving diluting fluid upon the suction stroke of said plunger and discharging it upon said screen upon the compression stroke of said plunger, a photo-electric couple, and means for sliding said screen with the contaminating particles from its oil receiving position to a position in the path of the light beam of said photo-electric couple.

2. Apparatus for testing the fitness of used lubricating oil comprising a receptacle, a screen slidably mounted adjacent the upper part of said receptacle, means for receiving a specimen of the oil to be tested and discharging it upon said screen, the fineness of said screen being determined to collect the larger contaminating particles from said oil and to permit the colloidal particles to filter through said screen with said oil into said receptacle, means for freeing the particles on said screen from oil comprising a diluent tank and a pump drawing diluting liquid from said tank and discharging it upon said screen, said pump being provided with a check valve opening to said atmosphere upon the suction stroke of said pump whereby a body of air is drawn in on top of the body of diluting liquid, and discharged upon said screen in sequence to said diluting fluid, a photo-electric couple, and means for sliding said screen from its oil receiving position to a position in the path of the light beam of said photo-electric couple, the latter being of that type including a gage for indicating variations in the current of the photo-electric element.

3. Apparatus for testing lubricating qualities of used oil and comprising: a support, a mesh screen positioned on said support to receive a sample of used oil to be tested and to separate the larger contaminating particles from the smaller and colloidal particles in said sample, a photo-electric couple on said support comprising a source of illumination and a photo-electric element including a gage for indicating variations in current therethrough, said screen being located in the path of the light beam between said source of illumination and said element.

4. Apparatus for testing the lubricating qualities of used oil comprising: a support, a filter movably mounted on said support in position to receive a sample of the used oil to be tested and for separating the larger contaminating particles therefrom, a photo-electric couple on said support and comprising a source of illumination and a photo-electric element including a gage for indicating variations in current therethrough, and means for moving said filter from its oil receiving position to a position in the path of the light beam between said source of illumination and the photo-electric element.

5. Apparatus for testing the lubricating qualities of used oil comprising: a support, a mesh screen movably mounted on said support in position to receive a sample of the used oil to be tested and for separating the larger contaminating particles therefrom, a photo-electric couple on said support comprising a source of illumination and a photo-electric element including a gage for indicating variations in current therethrough, and means for moving said screen from its oil receiving position to a position in the path of the light beam between the said source of illumination and the photo-electric element.

ALBERT G. THOMAS.